United States Patent
Schneider (10) Patent No.: US 8,371,543 B2
(45) Date of Patent: Feb. 12, 2013

(54) DEVICE FOR HANGING AN OBJECT ON A WALL

(76) Inventor: Timothy Wayne Schneider, Qualicum Beach (CA)

(*) Notice: Subject to any disclaimer, the term of this patent is extended or adjusted under 35 U.S.C. 154(b) by 56 days.

(21) Appl. No.: 12/970,611

(22) Filed: Dec. 16, 2010

(65) Prior Publication Data

US 2012/0153108 A1   Jun. 21, 2012

(51) Int. Cl.
*A47F 7/14* (2006.01)
(52) U.S. Cl. .................. 248/224.8; 248/495; 248/475.1; 52/713; 52/520
(58) Field of Classification Search .............. 248/224.8, 248/475.1, 476, 300; 40/757; D8/373; 52/713, 52/544, 520, 545, 578
See application file for complete search history.

(56) References Cited

U.S. PATENT DOCUMENTS

| | | | |
|---|---|---|---|
| 1,908,200 A | 5/1933 | Webster | |
| 2,219,975 A * | 10/1940 | Bentz | 248/220.1 |
| 2,299,443 A * | 10/1942 | Walmsley | 248/497 |
| 2,577,526 A * | 12/1951 | Kelly | 359/512 |
| 3,051,427 A | 8/1962 | Alvarez | |
| 3,838,842 A | 10/1974 | McCracken | |
| 4,012,023 A * | 3/1977 | Melanson | 248/489 |
| 4,149,692 A | 4/1979 | Califano | |
| 4,283,038 A | 8/1981 | Kurtz | |
| 4,458,872 A * | 7/1984 | Couch | 248/497 |
| 4,575,983 A * | 3/1986 | Lott et al. | 52/544 |
| 4,712,761 A | 12/1987 | Wassell | |
| 5,001,882 A * | 3/1991 | Watkins et al. | 52/547 |
| 5,222,341 A * | 6/1993 | Watkins et al. | 52/547 |
| 5,303,895 A * | 4/1994 | Hart | 248/475.1 |
| 5,511,354 A * | 4/1996 | Eidson | 52/544 |
| 5,606,838 A * | 3/1997 | Hughes et al. | 52/713 |
| D398,283 S * | 9/1998 | Miller | D12/223 |
| 5,911,663 A * | 6/1999 | Eidson | 52/520 |
| 5,961,090 A | 10/1999 | Parkin | |
| 6,076,904 A * | 6/2000 | Shepherd et al. | 312/209 |
| 6,367,220 B1 * | 4/2002 | Krause et al. | 52/512 |
| 6,557,813 B1 | 5/2003 | Duggan | |
| D481,932 S * | 11/2003 | Bess | D8/394 |
| 6,715,256 B1 * | 4/2004 | Fischer | 52/713 |
| D506,919 S | 7/2005 | Munson et al. | |
| D531,488 S | 11/2006 | Munson et al. | |
| D542,631 S | 5/2007 | Munson et al. | |
| 7,293,754 B2 * | 11/2007 | Gallien | 248/475.1 |
| 7,712,273 B2 * | 5/2010 | Panasik et al. | 52/459 |
| 7,788,874 B2 * | 9/2010 | Miller, Jr. | 52/712 |
| D638,284 S * | 5/2011 | Craft | D8/373 |
| 2002/0125389 A1 * | 9/2002 | Chu | 248/235 |
| 2003/0038222 A1 | 2/2003 | Holmes | |
| 2009/0224116 A1 * | 9/2009 | Gallien | 248/205.3 |

* cited by examiner

FOREIGN PATENT DOCUMENTS

ES   2288411   1/2008

*Primary Examiner* — Terrell McKinnon
*Assistant Examiner* — Daniel J Breslin
(74) *Attorney, Agent, or Firm* — Cameron IP

(57) ABSTRACT

There is provided a device for hanging an object on a wall. The device includes a wall mount and an object mount. One mount has a first bracket portion and a second bracket portion each being u-shaped and configured to receive the other mount. The bracket portions have a space between the bracket portions. The other mount has a projection disposable in the space between the bracket portions. The projection also acts as a safety tab. The bracket portions enable horizontal positioning of the object mount relative to the wall mount to be adjustable. The projection is configured to interact with the bracket portions and limit horizontal movement of the object mount relative to the wall mount to within a set range spanning the space from a first position, where the projection abuts the first bracket portion, to a second position where the projection abuts the second bracket portion.

14 Claims, 8 Drawing Sheets

DEVICE FOR HANGING AN OBJECT ON A WALL

FIELD OF THE INVENTION

The present invention relates to a device for hanging an object on a wall, and in particular, hanging a frame picture, mirror or the like, onto a wall.

DESCRIPTION OF THE RELATED ART

It is known to provide a device for hanging an object, such as a picture frame, on a wall where the device comprises an elongate u-shaped bracket that engages a corresponding elongate angled bracket with apertures that can align with studs. However relying on the position on the wall stud may result in an inconvenience to the user, because the location of the wall stud may not correspond with a desired position of the picture frame relative to the rest of the wall and room.

Some devices of the known prior art allow for horizontal adjustability of the picture frame. However, some of these devices may require numerous parts and thus may be relatively expensive to manufacture. Also, some of these devices may be bulky and cumbersome to assemble and connect to picture frames. Moreover, some such devices may render the picture frame susceptible to slidably dislodging off the wall and falling to the floor, thereby increasing the risk that the picture may become damaged.

There is accordingly a need for a device that connects to the wall in a secure manner, that allows for horizontal adjustability and height adjustability of the picture frame relative to the wall, that is relatively easy to install, that is configured to ensure that the picture frame remains connected to the wall, that requires relatively few parts, and that is relatively inexpensive to manufacture.

BRIEF SUMMARY OF INVENTION

The present invention provides a device disclosed herein that overcomes the above disadvantages. It is the object of the present invention to provide an improved device for hanging an object on a wall.

There is accordingly provided a device for hanging an object on a wall. The device includes a wall mount for fastening to the wall. The device includes an object mount for fastening to the object. A first one of the mounts has a first bracket portion and a second bracket portion each being u-shaped and configured to receive at least part of a second one of the mounts. The bracket portions have a space between the first bracket portion and the second bracket portion. The second one of the mounts has a projection disposable in the space between the bracket portions. The bracket portions enable horizontal positioning of the object mount relative to the wall mount to be adjustable. The projection is configured to interact with the bracket portions and limit horizontal movement of the object mount relative to the wall mount to within a set range spanning the space from a first position, where the projection abuts the first bracket portion, to a second position where the projection abuts the second bracket portion.

There is also provided a device for hanging an object on a wall. The object has a horizontal edge. The wall has a wall stud. The device includes a wall mount for fastening to the wall stud. The wall mount has a plurality of apertures configured to align with the wall stud, the apertures allowing for height adjustability and enabling fasteners to pass therethrough for engaging with the wall stud. The device includes an object mount for fastening to the object. A first one of the mounts has at least one bracket portion configured to receive at least part of a second one of the mounts. At least part of the bracket portion is u-shaped in cross-section. The object mount has a peripheral edge. The object mount has a plurality of apertures extending parallel to and spaced-apart from the peripheral edge. The object mount has a pair of spaced-apart positioning tabs disposed along and extending outwards from the peripheral edge of the object mount. The positioning tabs are configured to abut against the horizontal edge of the object. The positioning tabs thus act to facilitate horizontal levelling of the object relative to the object mount and facilitate insertion of fasteners through the apertures of the object mount and into the object. The object mount is fastened to the object thereby.

There is further provided a device for hanging an object on a wall. The device includes a wall mount for fastening to the wall. The device includes an object mount for fastening to the object. A first one of the mounts has a first bracket portion and a second bracket portion each configured to receive at least part of a second one of the mounts. At least part of each of the bracket portions is u-shaped in cross-section. Each of the bracket portions has an elongated slot. The slots have a first end and a second end opposite thereof. The first ends of the slots face each other. The second one of the mounts has a projection shaped to at least partially extend through the slots. The bracket portions enable horizontal positioning of the object mount relative to the wall mount to be adjustable. The projection is configured to interact with the bracket portions and limit horizontal movement of the object mount relative to the wall mount to within a set range spanning the space from a first position, where the projection abuts a part of the first bracket portion adjacent to the second end of its slot, to a second position where the projection abuts a part of the second bracket portion adjacent to the second end of its slot.

BRIEF DESCRIPTION OF DRAWINGS

The invention will be more readily understood from the following description of preferred embodiments thereof given, by way of example only, with reference to the accompanying drawings, in which.

DESCRIPTION OF THE PREFERRED EMBODIMENTS

Figure 1:
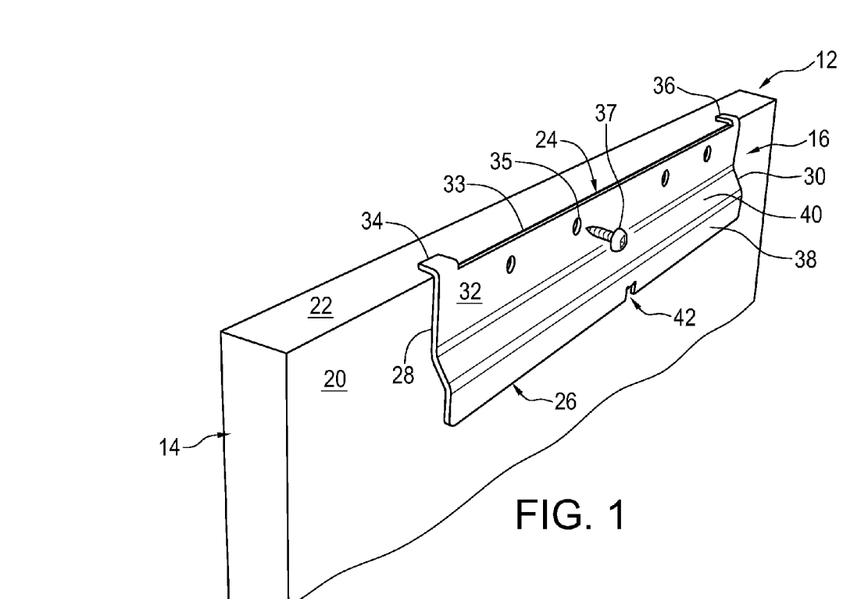
FIG. 1 is a perspective view of an object mount according to one embodiment, the object mount being mounted onto a horizontal edge of an object and the object being shown in fragment.
Figure 5:
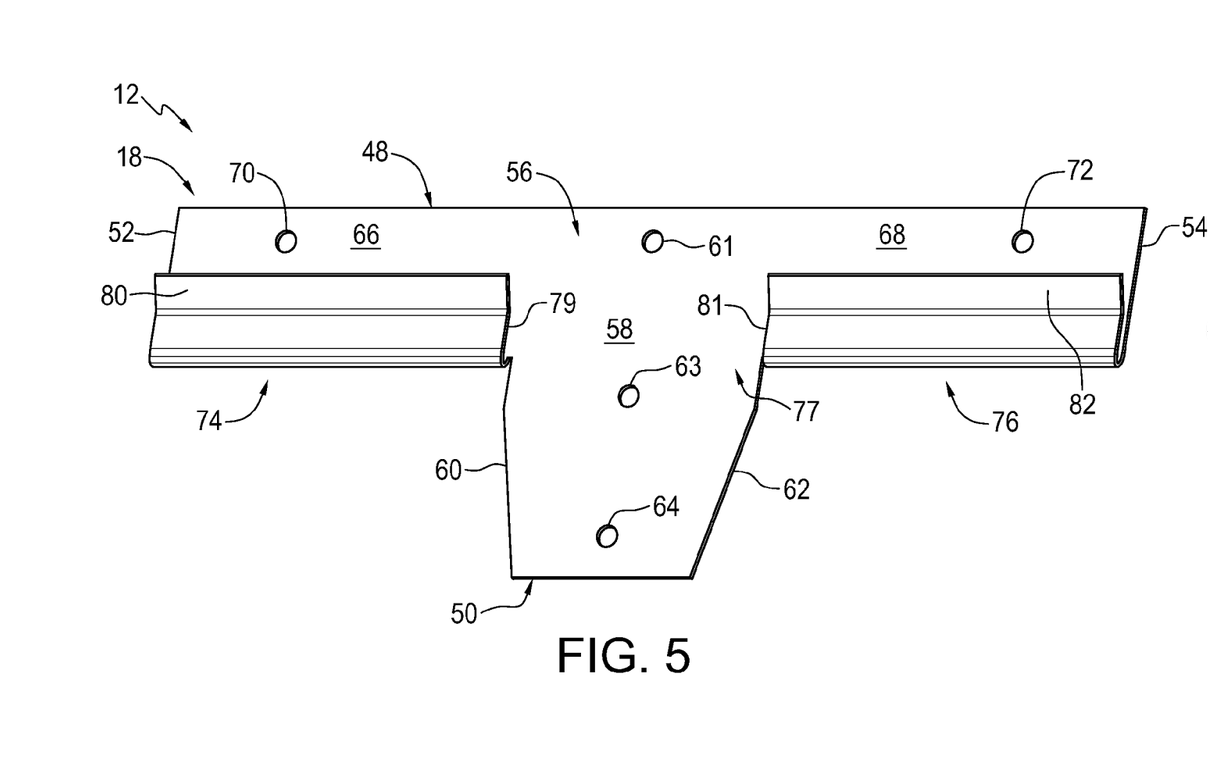
FIG. 5 is a front perspective view of a wall mount according to one embodiment, the wall mount including a pair of spaced-apart bracket portions.
Figure 7:
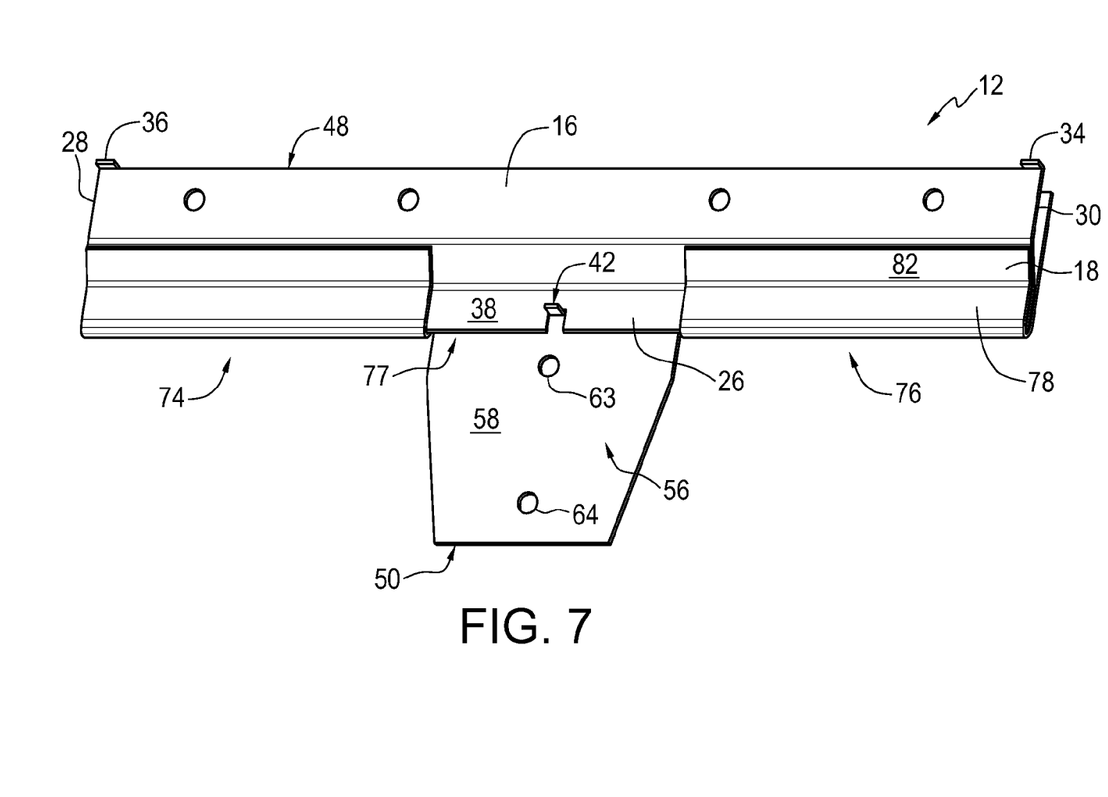
FIG. 7 is a front perspective view of the object mount shown in FIG. 1 engaging with and partially disposed within the wall mount shown in FIG. 5, with the projection of the object mount being centrally disposed between the bracket portions of the wall mount.
Figure 8:
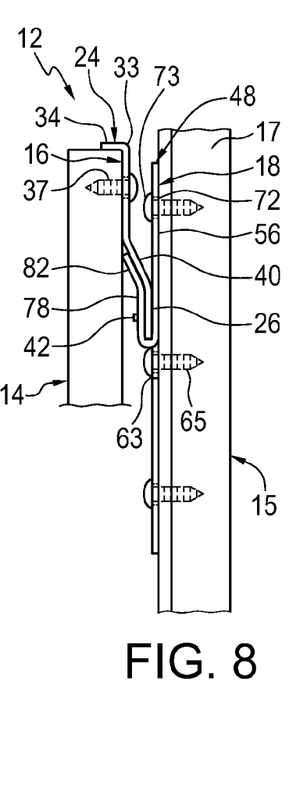
FIG. 8 is a side elevation view of the object mount and the wall mount shown in FIG. 7, the object mount being connected to the object and the wall mount being connected to a stud of a wall.

Referring to the drawings and FIGS. 1, 5 and 7, there is provided a device 12 for hanging an object, in this example a picture frame 14, onto a wall 15, shown in FIG. 8. As shown in FIG. 1, the picture frame 14 has a back side 20 and a peripheral edge in this example a top horizontal edge 22.

The device 12 includes an object mount 16 as best shown in FIGS. 1 to 4. The object mount 16 in this example is made of sheet metal cut and bent into the desired shape. The object mount 16 has a top 24, a bottom 26 opposite thereof and a pair of opposed sides 28 and 30. The object mount 16 has an elongate mounting strip 32 adjacent the top 24. The strip is generally rectangular in shape in this example and extends from side 28 to side 30. The mounting strip 32 is configured to abut with and extend along the back side 20 of the picture frame 14. The object mount 16 includes a plurality of apertures 35 extending through the mounting strip 32. The apertures 35 receive fasteners such as nails or screws 37 to connect to the frame 14.

The object mount 16 includes a peripheral edge 33 at its top 24 and extending between sides 28 and 30. The peripheral edge 33 is configured to align with and extend adjacent to the horizontal edge 22 of the frame 14. The apertures 35 extend parallel to and are spaced-apart from the peripheral edge 33. The apertures 35 enable the screws 37 to pass therethrough.

The object mount 16 has a pair of spaced-apart projecting members, in this example positioning tabs 34 and 36 disposed along and extending outwards from the peripheral edge 33 of the object mount. The positioning tabs 34 and 36 in this example are generally rectangular in shape and are disposed adjacent to sides 28 and 30, respectively, of the object mount. The positioning tabs 34 and 36 in this example extend from the mounting strip 32 at an angle of 90 degrees relative to the elongate mounting strip 32. The positioning tabs 34 and 36 are configured to abut against the horizontal edge 22 of the frame 14.

The object mount 16 includes an elongate rail strip 38 configured to be spaced-apart from the frame 14 and configured to extend in parallel with the mounting strip 32. Rail strip 38 extends from side 28 to side 30 and is adjacent to bottom 26.

Figure 2:
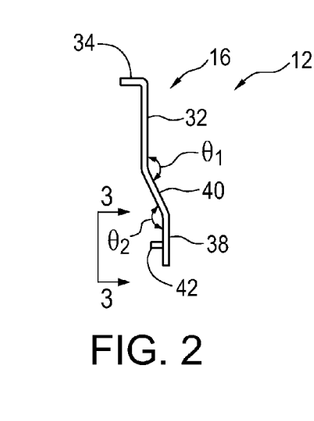
FIG. 2 is a side elevation view of the object mount shown in FIG. 1.

The object mount 16 includes an angled strip 40 extending from side 28 to side 30. Angled strip 40 is interposed between and connects together the rail strip 38 and the mounting strip 32. As shown in FIG. 2, the angled strip 40 extends from the mounting strip 32 at an angle $\theta_1$ that is equal to or greater than 90 degrees relative to the mounting strip 32 and in this example angle $\theta_1$ is equal to 150 degrees. The angled strip extends from the rail strip 38 at an angle $\theta_2$ that is equal to or greater than 90 degrees relative to the rail strip 38 and in this example angle $\theta_2$ is equal to 150 degrees. The object mount 16 thus may be said to have an elongated z-shape in cross-section.

Figure 3:
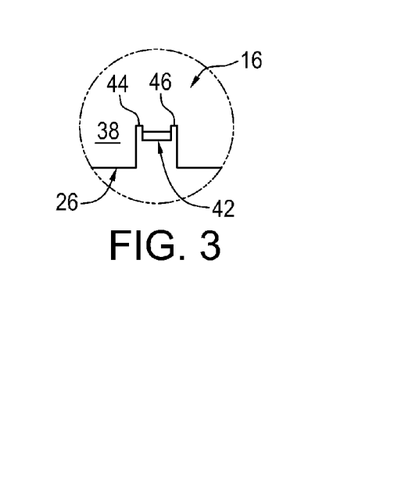
FIG. 3 is a fragmentary rear view of the object mount, from the perspective of lines 3-3 of FIG. 2, showing a projection of the object mount.
Figure 4:
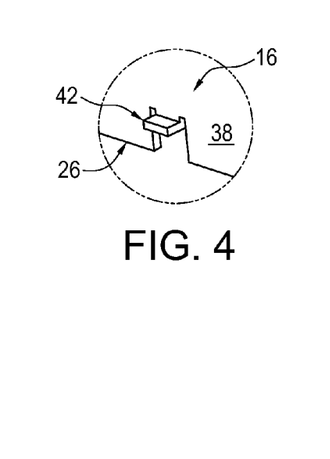
FIG. 4 is a fragmentary, perspective view of the object mount including the projection as shown in FIG. 3.

The object mount 16 includes a centrally disposed projection 42. The projection 42 in this example is formed by a bent portion partially cut-out from the rail strip 38. Referring to FIG. 3, the projection 42 in this example is formed by cutting a pair of spaced-apart slits 44 and 46 into the rail strip 38 from the bottom 26 of the object mount towards the top of the object mount and then bending outwards the portion of the rail strip interposed between the slits 44 and 46. As best shown in FIG. 7, the projection 42 is disposed equidistant to sides 28 and 30 in this example. As best shown in FIG. 2, the projection 42 is connected to and extends from the rail strip 38 at an angle relative to the rail strip 38 and in this example at an angle of 90 degrees relative to the rail strip 38. Both the projection 42 and the positioning tabs 34 extend in the same direction as shown in FIG. 2. The projection 42 in this example is generally in the shape of a rectangular prism.

According to one example, the sheet metal is 18 gauge in thickness. The object mount 16: from side 28 to 30, is 8 inches long; and from top 24 to bottom 26, is 1.5 inches wide. The projection 42 accordingly to one example extends outwards relative to the rail strip 38 by $\frac{1}{8}^{th}$ of an inch and is $\frac{1}{8}^{th}$ of an inch wide in the horizontal direction, extending parallel with the rail strip 38. The positioning tabs 34 and 36 are $\frac{3}{8}^{th}$ of an inch wide in the horizontal direction, relative to FIG. 7, and extend outwards from the mounting strip 32 by about one quarter of an inch. However none of these dimensions are strictly required and other dimensions are possible within the scope of the invention and also other materials may be used to make this device.

Figure 6:
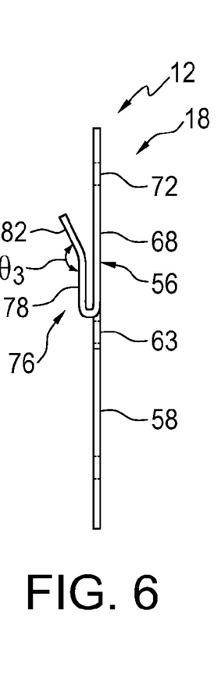
FIG. 6 is a side elevation view of the wall mount shown in FIG. 5.

The device 12 also includes a wall mount 18 as shown in FIGS. 5 and 6. Referring now to FIG. 5, the wall mount 18 is also in this example made of sheet metal cut and formed into the desired shape. The wall mount 18 has a top 48, a bottom 50 opposite thereof, and a pair of spaced-apart opposed sides 52 and 54. The wall mount 18 includes a mounting plate 56 configured to abut the wall 15, as shown in FIG. 8. The mounting plate 56 has an elongate central portion 58 extending from the top 48 to the bottom 50 of the wall mount. The central portion is generally rectangular in shape and has tapered sides 60 and 62 extending inwardly towards the bottom 50. The wall mount 18 has a plurality of apertures, in this example apertures 61, 63 and 64 extending through the central portion 58 of the mounting plate 56. The apertures 61, 63 and 64 are configured to align with a wall stud 17 of the wall 15, as shown in FIG. 8. The apertures 61, 63 and 64 enable fasteners such as nails or screws, to pass therethrough and into the wall stud 17, as shown by screw passing through aperture 63.

The mounting plate 56 has a pair of peripheral portions 66 and 68 on either side of the central portion 58 adjacent to the top 48. Peripheral portion 66 of the mounting plate 56 extends from side 52 towards side 54 and peripheral portion 68 of the mounting plate 56 extends from side 54 towards side 52. Peripheral portions 66 and 68 of the mounting plate 56 together with the part of the central portion 58 of the mounting plate 56 therebetween may be said to comprise an elongated strip that is rectangular in shape. Peripheral portion 66 of the mounting plate 56 has an aperture 70 extending therethrough and peripheral portion 68 of the mounting plate 56 has an aperture 72 extending therethrough. Apertures 70 and 72 enable further fasteners such as nails or screws 73 as shown in FIG. 8 to pass therethrough and fasten to the wall 15.

The wall mount 18 includes a pair of spaced-apart bracket portions 74 and 76. In this example mounting plate 56 forms part of the bracket portions as shown in FIG. 6. The bracket portions 74 and 76 are configured to receive at least part of the object mount 16, and more particularly, the rail strip 38 shown in FIG. 1. Referring back to FIG. 5, the bracket portions 74 and 76 are spaced-apart from top 48, are adjacent to peripheral portions 66 and 68, respectively, of the mounting plate 56 and in this example align with and are spaced-apart from apertures 70 and 72. Bracket portion 74 extends from side 52 towards side 54 and bracket portion 76 extends from side 54 towards side 52. The bracket portions 74 and 76 are disposed on either side of the central portion 58 of the mounting plate 56 and a space 77 is thus formed between the bracket portions. Central portion 58 of the mounting plate 56 extends well below and past the bracket portions 74 and 76 to bottom 50 of the wall mount 18, the wall mount thus being t-shaped, and this extended shape and length of the central portion 58 of the mounting plate 56 when connected to the wall provides increased stability for the bracket portions 74 and 76.

Accordingly to one example, the wall mount 18 from side 52 to side 54, is 8 inches long. The central portion 58 in one example, from top 48 to bottom 50, is 3 inches long and 2 inches wide between bracket portions 74 and 76. The bracket portions 74 and 76 are each 3 inches long in the horizontal direction, relative to FIG. 5, and the space 77 is about 2 inches wide. However here too none of these dimensions axe strictly required and other dimensions are possible within the scope of the invention.

Referring to FIG. 6, each of the bracket portions as indicated by bracket portion 76 has a part that is u-shaped in cross-section and these may be referred to as u-shaped parts 78. Referring to FIG. 5, the bracket portions 74 and 76 include a pair of spaced-apart angled strips 80 and 82. Angled strip 80 extends from side 52 towards side 54 and angled strip 82 extends from side 54 towards side 52. The angled strips 80 and 82 are in the form of generally rectangular strips. The angled strips 80 and 82 are connected to and extend outwards from the u-shaped parts of the bracket portions, as shown in FIG. 6 with angled strip 82 and u-shaped part 78. The angled strips 80 and 82 extend from the u-shaped portions 78 at a non-perpendicular angle $\theta_3$ relative to the exterior of the u-shaped portions 78 and in this example angle $\theta_3$ is 150 degrees. The angled strips 80 and 82 are configured to guide and deflect the rail strip 38, shown in FIG. 1, to fit within the u-shaped parts 78 of the bracket portions. Angled strips 80 and 82 are configured to align with, extend along and abut with the angle strip 40 of the object mount 16, shown in FIG. 1.

In use and referring first to FIG. 1, a user aligns positioning tabs 34 and 36 of the object mount 16 with the horizontal edge 22 of the frame 14. The positioning tabs 34 and 36 thus provide automatic levelling of the frame 14 relative to the object mount 16, thereby facilitating insertion of fasteners through the apertures 35 of the object mount 16 and into the frame 14. The user may then pass screw 37 through apertures 35 so as to fasten the object mount 16 to the frame 14 in a relatively easy manner, using for example only one hand to accomplish this task.

Referring to FIG. 5, the user next aligns central portion 58 of the mounting plate 56 of the wall mount 18 with the wall stud 17 of the wall 15, as shown in FIG. 8, levels the wall mount 18 and then passes screws 65 through apertures 61, 63 and 64 and into the wall stud 17. A wall stud finder may be used to locate the wall stud 17 to this end. Screws 73 may then be passed through apertures 70 and 72 of the peripheral portions 66 and 68 of the mounting plate 56 to further secure the wall mount 18 to the wall 15.

The frame 14, with its object mount 16 now connected thereto, may then hook onto the wall mount 18, as shown in FIG. 7. The frame 14 is not shown in FIG. 7 for illustration purposes. The user disposes rail strip 38 partially within bracket portions 74 and 76 such that projection 42 is disposed within the space 77 between the bracket portions 74 and 76.

Figures 9, 10:
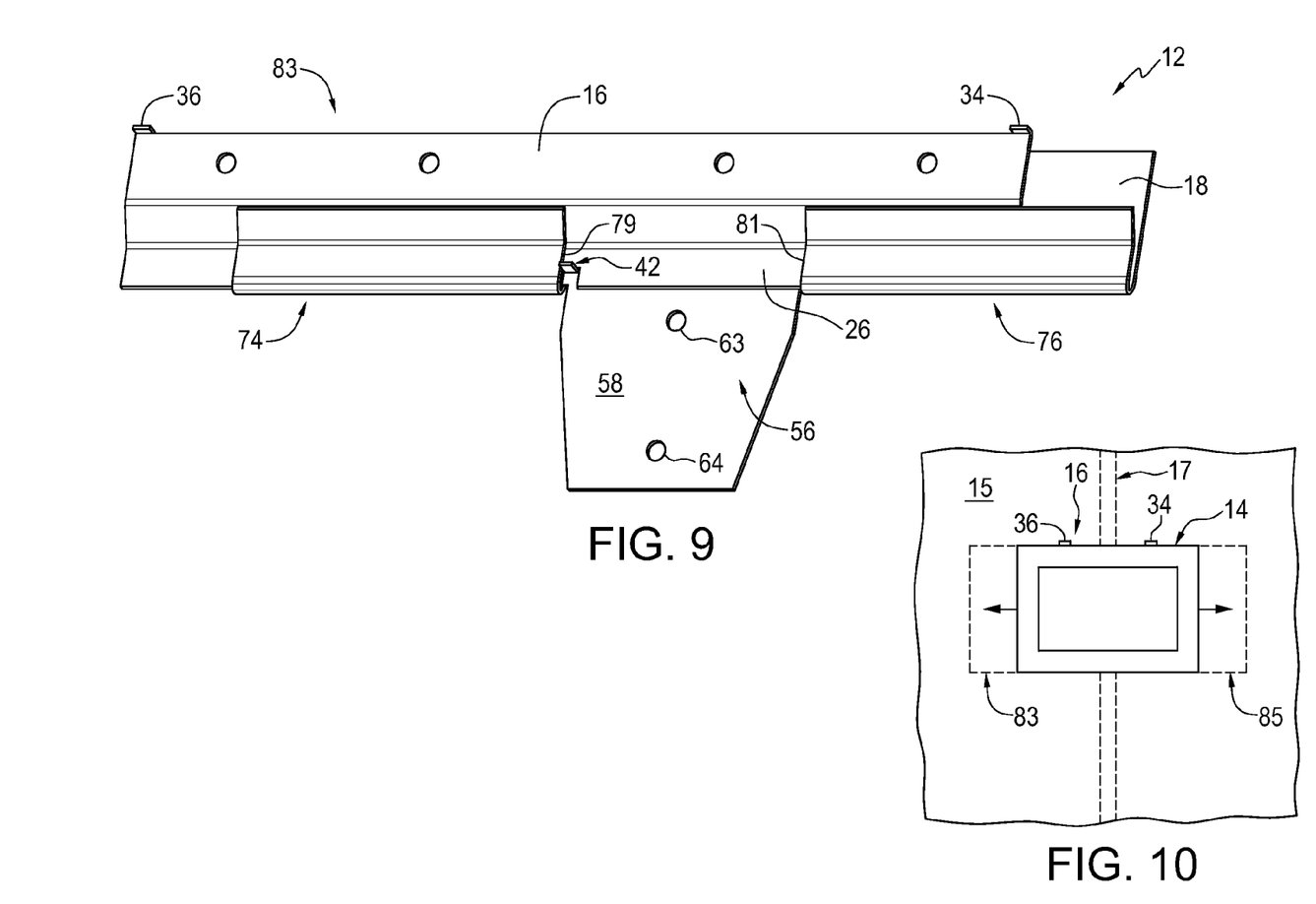
FIG. 9 is a front perspective view similar to that shown in FIG. 7 of the object mount engaging with and partially disposed within the wall mount, with the object mount disposed to the left from the perspective of the FIG. 9 and with the projection of the object mount abutting one of the bracket portions of the wall mount.
FIG. 10 is an elevation front view of the object in this example a picture frame, the wall, and the object mount partially shown, with a first position and a second position of the frame as well as the wall stud being shown in hidden lines.

The position of the frame 14 may next be horizontally adjusted. The bracket portions 74 and 76 and the projection 42 are configured to interact and enable the horizontal position of the object mount 16 to be adjusted relative to the wall mount 18 within a set range. The object mount 16 may be slidably displaced, with the rail strip 38 slidably adjustable within bracket portions 74 and 76 to the left or to the right from the perspective of FIG. 7. Referring to FIG. 9, the object mount 16 is moveable to a first position 83 where the projection 42 abuts inner edge 79 of the bracket portion 74, which acts as a stop. Bracket portion 74 and projection 42 are thus configured engage and inhibit any further movement to the left from the perspective of FIG. 9 which may otherwise cause the object mount 16 to slip entirely out of engagement with the wall mount 18. The object mount 16 is moveable to a second position 85, shown in FIG. 10, where the projection 42 abuts inner edge 81 of bracket portion 76. Inner edges 79 and 81 are configured to face each other. Thus bracket portion 76 and projection 42 likewise are configured to inhibit any further horizontal movement to the right from the perspective of FIG. 9 that may otherwise cause the frame 14 to fall out of the wall mount 18. The projection 42 thus acts as a safety tab. The set range thus spans from the first position 83 shown in FIG. 10, through the mid-position shown in FIG. 7, to the second position 85 shown in FIG. 10. In one example, the device as herein described may allow horizontal adjustment of the picture frame 14 within a set range of three inches relative to the wall stud 17, though the device may be configured in other embodiments and dimensions to allow for a larger range of horizontal adjustment.

Referring to FIG. 8, the object mount 16 in this example is configured such that its top 24 extends past, or put another way, is located higher than top 48 of the wall mount 18 when the mounts 16 and 18 are engaged together. This advantageously enables the wall mount 18 to be hidden behind the object mount and its associated picture frame. Alternatively the object mount and the wall mount may be configured such that top 24, peripheral edge 33, and top 48 align with each other at the same height. This provides the advantage of enabling the user to locate the picture frame at a vertical height exactly as desired, because vertical positioning of the peripheral edge 33 of the object mount 16, and therefore vertical positioning of the horizontal edge 22 of the frame 14, as shown in FIG. 1, in this case would directly correlate with vertical positioning of the top 48 of the wall mount 18 relative to the wall.

Many advantages result from the structure of the present invention. For example, the device 12 as herein described provides the advantage of being securely mountable to a wall stud while being slidably adjustable to allow a picture or mirror to be selectively offset from the stud location as desired. Thus the device 12 as herein described, with its central projection 58 of the mounting plate 56 and sliding rail strip, provides flexibility and adjustability with respect to the exact positioning of the picture while at the same time, with its central portion 58 of the mounting plate 56 configured to attach to the wall stud, enabling a very strong connection to the wall. The device as herein described thus may enable the mounting of relatively large and heavy objects.

The device 12 as herein described, by providing an elongate central portion 58 with apertures 61, 63 and 64 configured to align with the wall stud, renders the use of wall plugs unnecessary as well as allowing for height adjustability on wall 15. This thereby further simplifies the installation of the device 12. The elongate aspect of the central portion 58 of the mounting plate 56 so connected provides further stability to the bracket portions 74 and 76.

The bracket portions 74 and 76 together with the central projection 58 of the mounting plate 56 ensure that some adjustability is permitted while, at the same time, inner edges 79 and 81 of the bracket portions 74 and 76 are so positioned as to eventually abut with and stop movement of the projection 42 if the frame 14 is slid too far. The device 12 as herein described thus provides the further advantage ensuring that the frame 14 can slide, but not slide off the wall mount 18 and thus fall off the wall and get damaged. The projection 42 together with the portions of the bracket portions 74 and 76 that abut therewith thus form safety stops for the device 12.

As previously mentioned, the positioning tabs 34 and 36 enable the object mount to be connected to the frame in a very user-friendly manner. The user may accomplish this task by for example only one hand.

The angled strips 80 and 82 are configured to guide and deflect the rail strip 38 to within the u-shaped portions 78 of the bracket portions 74 and 76. The angled strips 80 and 82 thus enable the object mount 16 to be connected to the wall mount 18 in an even more user-friendly manner.

The device as herein described provides the further advantage of needing relatively few parts. The device may thus be more compact, less bulky, less expensive to manufacture and easier to assemble.

Figure 11:
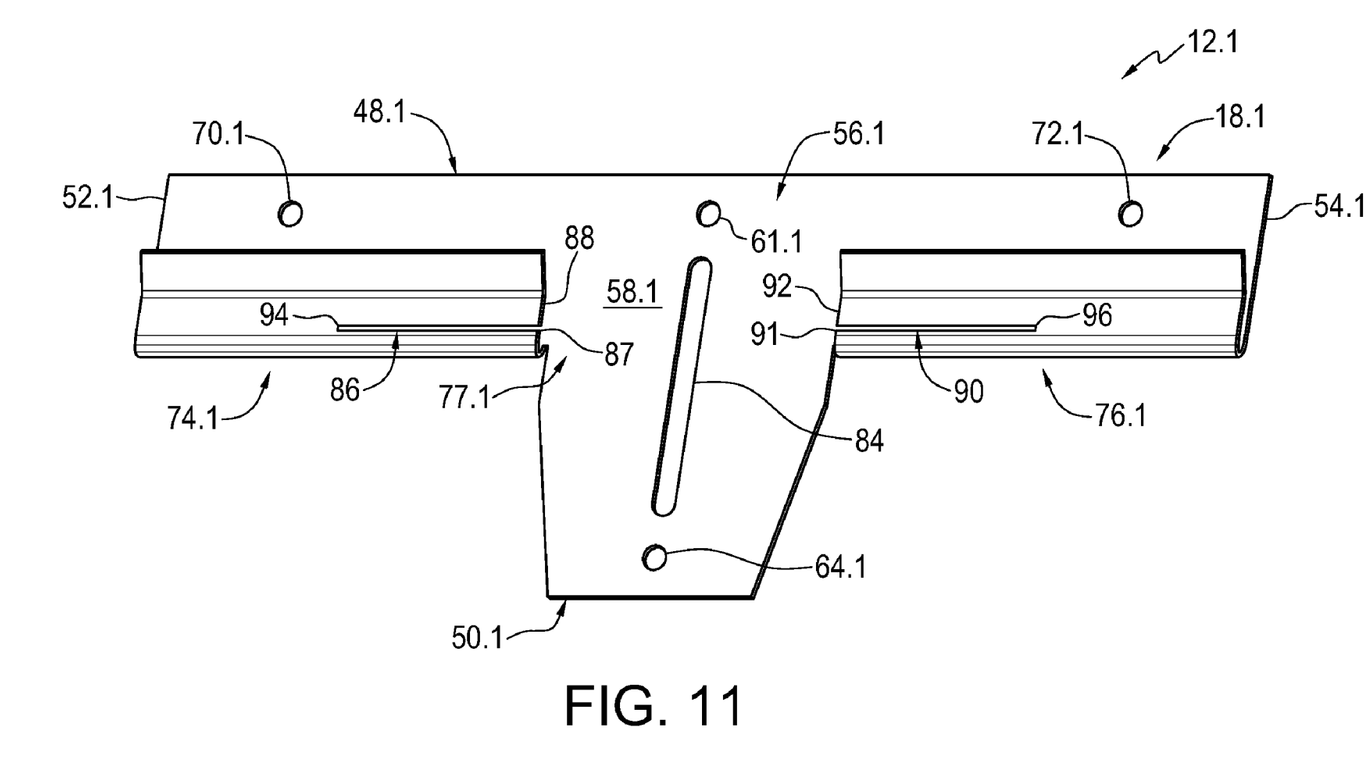
FIG. 11 is a front perspective view of a wall mount according to another embodiment, with the wall mount having a centrally disposed, elongate slot and bracket portions with horizontally extending slots.

FIG. 11 shows a wall mount 18.1 for a device 12.1 according to another embodiment. Like parts have like numbers and function as the embodiment shown in FIGS. 5 to 9 with the addition of ".1". The wall mount 18.1 is substantially the same as the wall mount 18 shown in FIGS. 5 to 9 with one exception being that wall mount 18.1 further includes an elongate, vertical slot 84 that extends through central portion 58.1 with a pair of apertures 61.1 and 64.1 adjacent to either end of the slot 84. Slot 84 is centrally disposed along central portion 58.1 and extends from a position adjacent to top 48.1, past bracket portions 74.1 and 76.1 and towards bottom 50.1. Slot 84 provides the device 12.1 with the further advantage of enabling the wall mount 18.1 to be vertically adjustable relative to the wall stud, in addition to the device 12.1 being horizontally adjustable relative to the wall stud.

Also, the first bracket portion 74.1 has a slot 86 that extends from a first end 87 of the slot 86 located by inner end 88 of the bracket portion 74.1 that is adjacent to central portion 58.1, towards side 52.1 of the wall mount 18.1. The second bracket portion 76.1 has a slot 90 that extends from a first end 91 of the slot located by inner end 92 of the bracket portion 76.1 adjacent to central portion 58.1, towards side 54.1 of the wall mount 18.1. The slots 86 and 90 are disposed within the u-shaped part of the bracket portions and extend in a generally horizontal direction relative to FIG. 11. The slots 86 and 90 extend along approximately half the length of their respective bracket portions in this example.

The object mount to be used in association with wall mount 18.1 may be substantially the same as that shown in FIGS. 1 to 4 and 7 to 10. The slots 86 and 90 are configured to allow the projection 42 of the object mount, as for example shown in FIGS. 1 to 4, to pass therethrough. The slots 86 and 90 thus act to effectively increase the range within which the object mount may be adjusted relative to the wall mount. The object mount may thus be moved from a first position where the projection abuts a part of the bracket Portion 74.1 surrounding second end 94 of slot 86, to a second position where the projection abuts a part of the bracket portion 76.1 surrounding second end 96 of slot 90.

Figure 12:
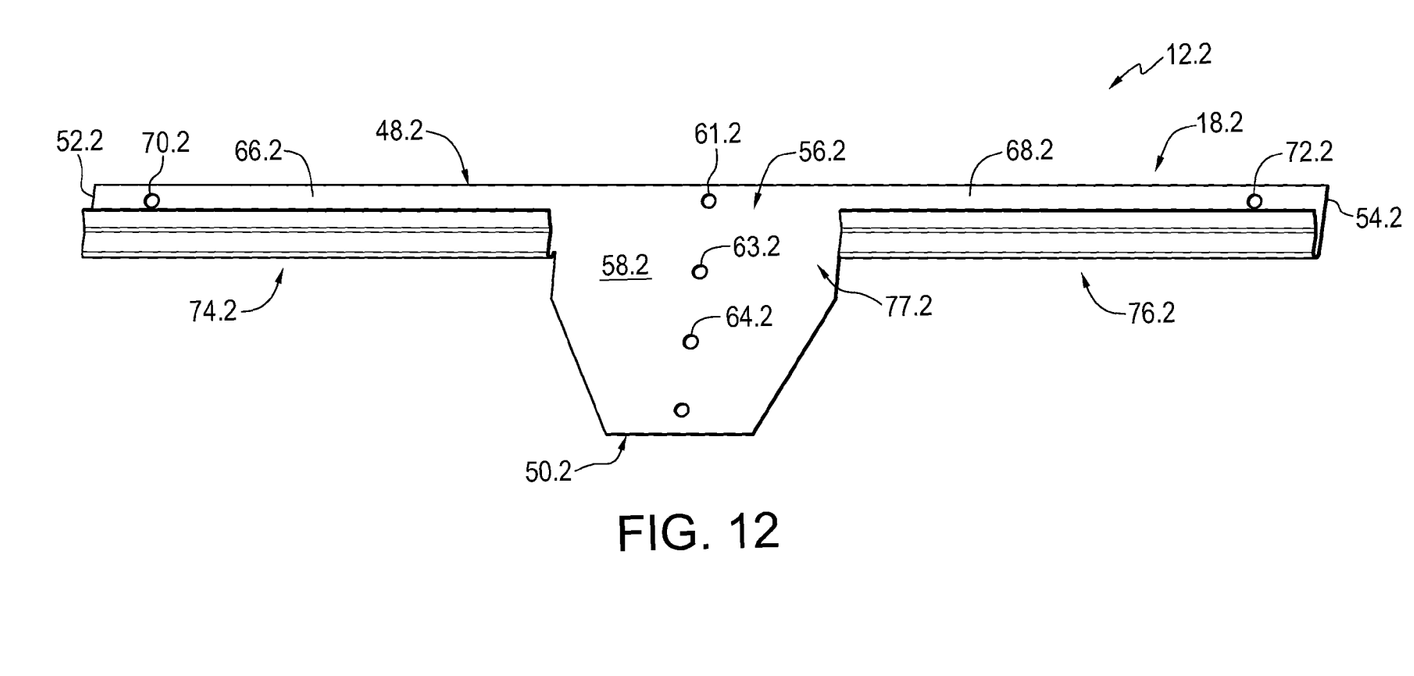
FIG. 12 is a front perspective view of a wall mount according yet another embodiment, with the wall mount having elongate peripheral portions and bracket portions and having a wider central portion between the bracket portions.

FIG. 12 shows a wall mount 18.2 for a device 12.2 according to yet another embodiment. Like parts have like numbers and function as the embodiment shown in FIGS. 5 to 9 with the addition of ".2". The wall mount 18.2 is substantially the same as the wall mount 18 shown in FIGS. 5 to 9 with the exception that wall mount 18.2 has relatively longer, elongated peripheral portions 66.2 and 68.2 and elongated bracket portions 74.2 and 76.2, compared to peripheral portions 66 and 68 and bracket portions 74 and 76 shown in FIG. 5 and has a central portion 58.2 of the mounting plate 56.2 and a space 77.2 that are relatively wider compared to the central portion 58 and space 77 shown in FIG. 5. In one example: the wall mount 18.2, from side 52.2 to side 54.2, is 18 inches in length; the bracket portions 74.2 and 76.2 and peripheral portions 66.2 and 68.2 are each 7 inches in length; and the space 77.2 is 4 inches in length.

Elongate peripheral portions 66.2 and 68.2 include apertures 70.2 and 72.2, respectively. Elongate peripheral portions 66.2 and 68.2 are so shaped and apertures 70.2 and 72.2 as so positioned as to enable fasteners to pass through apertures 70.2 and 72.2 and into further respective wall studs, in addition to the wall stud aligned with central portion 58.2 of the mounting plate 56.2. The device 12.2 thus provides the advantage of enabling the wall mount 18.2 to be fastened to the wall with relatively even greater force. The device 12.2 shown in FIG. 12, for example, may support a mirror that is 8 feet across in width or a yet bigger picture frame. The object mount to be used in association with wall mount 18.2 may be an elongated version of that shown in FIGS. 1 to 4.

Also, because bracket portions 74.2 and 76.2, central portion 58.2 and space 77.2 are relatively longer and wider, this advantageously enables the device to accommodate an increased horizontal range within which the picture frame may be adjusted.

Figure 13:
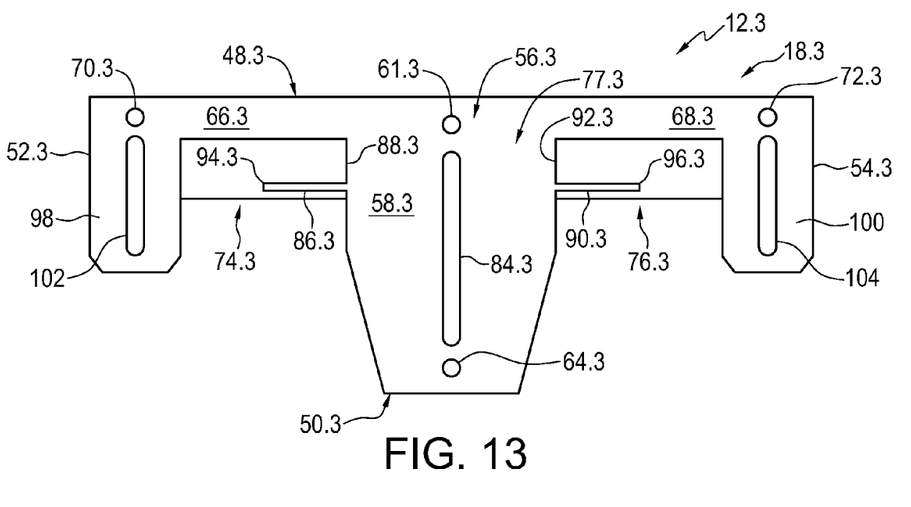
FIG. 13 is a front elevation view of a wall mount according to a further embodiment, the wall mount including a pair of elongate end portions.

FIG. 13 shows a wall mount 18.3 for a device 12.3 according to a further embodiment. Like parts have like numbers and function as the embodiment shown in FIG. 11 with the additional numeral ".3" replacing ".1". The wall mount 18.3 is substantially the same as the wall mount 18.1 shown in FIG. 11 with the exception that wall mount 18.3 includes a pair of elongate end portions 98 and 100 by sides 52.3 and 54.3, respectively of the wall mount. The end portions 98 and 100 each extend downwards, or in the vertical direction relative to FIG. 13, past the bracket portions 74.3 and 76.3 and in the direction of bottom 50.3. The end portions 98 and 100 have elongate slots 102 and 104, respectively, which in conjunction with slot 84.3, further support and enable vertical adjustment of the wall mount 18.3 relative to the wall stud. The object mount to be used in association with wall mount 18.3 may be substantially the same as that shown in FIGS. 1 to 4 and 7 to 10.

Figure 14:
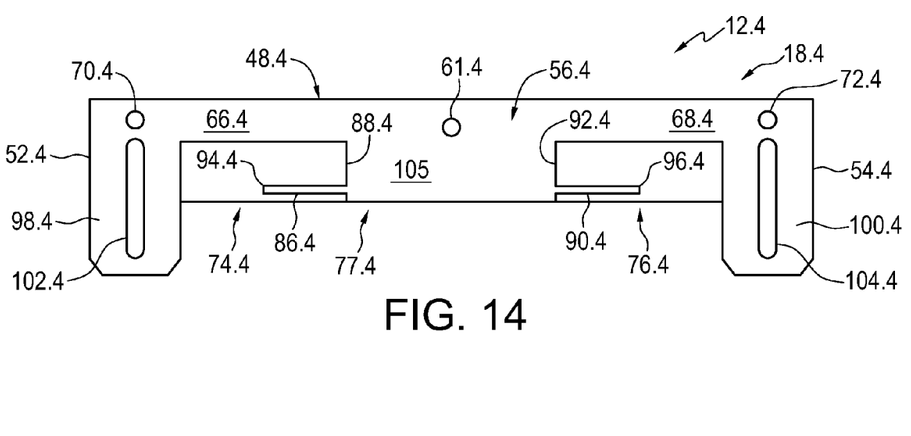
FIG. 14 is a front elevation view of a wall mount similar to that shown in FIG. 13 according to yet a further embodiment.

FIG. 14 shows a wall mount 18.4 for a device 12.4 according to yet a further embodiment. Like parts have like numbers and function as the embodiment shown in FIG. 13 with the additional numeral ".4" replacing ".3". The wall mount 18.4 is substantially the same as the wall mount 18.3 shown in FIG. 13 with the exception that wall mount 18.4 includes a central portion 105 that is interposed between and extends in parallel with peripheral portions 66.4 and 68.4. Put another way, elongate end portions 98.4 and 100.4 have rendered an elongate central portion, such as elongate central portion 58.3 that shown in FIG. 13, unnecessary. Central portion 105 aligns with and extends in parallel with bracket portions 74.4 and 76.4. The object mount to be used in association with wall mount 18.4 may be substantially the same as that shown in FIGS. 1 to 4 and 7 to 10.

Figure 15:
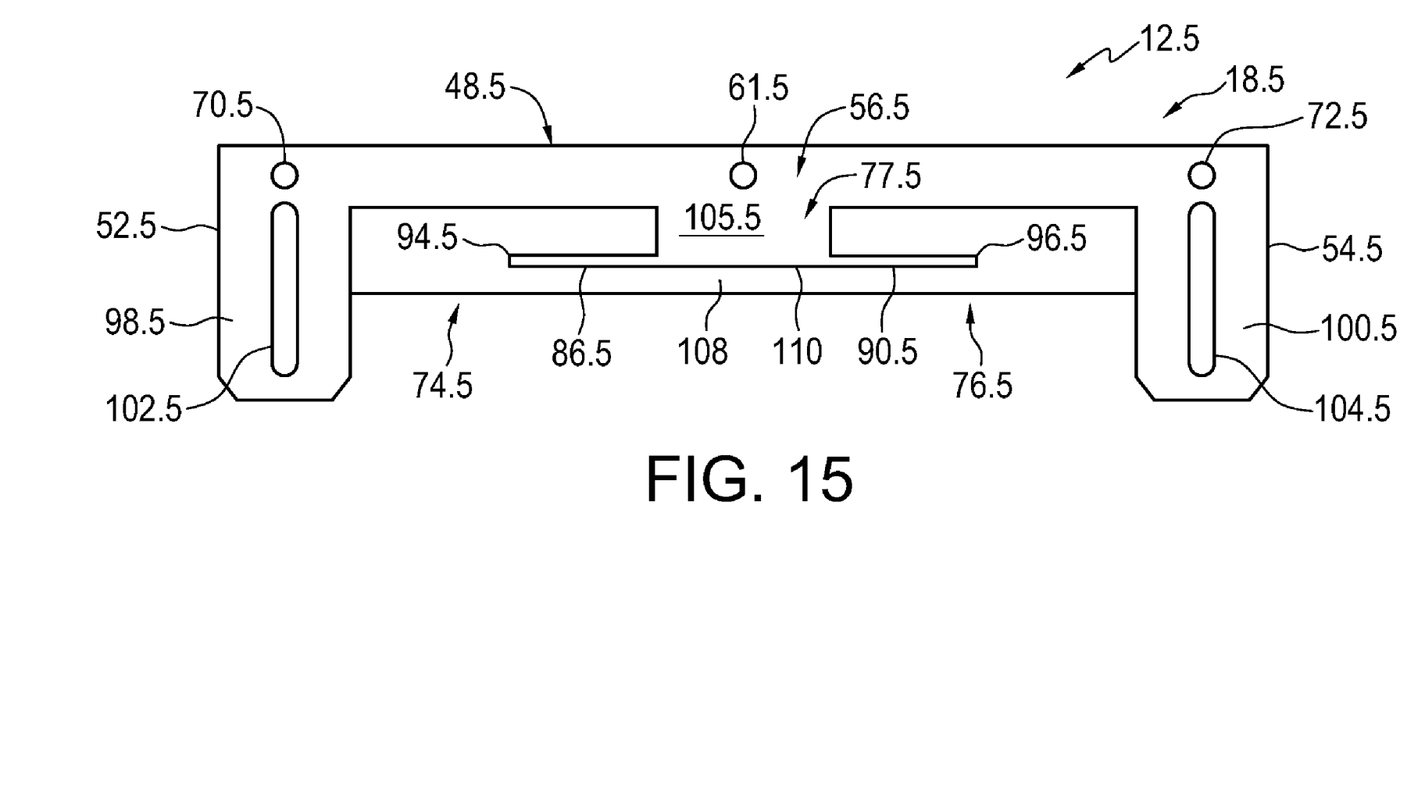
FIG. 15 is a front elevation view of a wall mount similar to that shown in FIG. 14 according to an even further embodiment, the wall mount including a central bracket portion.

FIG. 15 shows a wall mount 18.5 for a device 12.5 according to an even further embodiment. Like parts have like numbers and function as the embodiment shown in FIG. 14 with the additional numeral ".5" replacing ".4". The wall mount 18.5 is substantially the same as the wall mount 18.4 shown in FIG. 14 with the exception that wall mount 18.5 includes a central bracket portion 108 interposed between and integral with bracket portions 74.5 and 76.5. Bracket portions 74.5, 108, and 76.5 thus form an integral, single bracket. Central bracket portion 108 is u-shaped and extends to a top edge 110 that is aligned and parallel with slots 86.5 and 90.5. Projection 42 of the object mount may thus slide along top edge 110 of bracket portion 108. Bracket portion 108 provides the further advantage of rendering the wall mount 18.5 stronger and relatively more robust. This is in turn enables relatively larger objects to be operatively supported by the wall mount. The object mount to be used in association with wall mount 18.5 may be substantially the same as that shown in FIGS. 1 to 4 and 7 to 10.

Many variations are possible within the scope of the present invention. For example, the object mount has been described as having the rail strip 38 and the projection 42 and the wall mount has been described as having the pair of bracket portions 74 and 76. In the alternative, the object mount may be configured to have the pair of bracket portions and the wall mount may be configured have the corresponding rail strip 38 and the projection 42.

Also, it is not strictly required that the central portion of mounting plate of the wall mount align with and connect via fasteners to the wall stud of the wall. For example, the wall mount may be connected via fasteners to the wall with suitable wall plugs, which are well known to those skilled in the art.

The device as herein described is made of sheet metal. The sheet metal may be galvanized steel sheet. Alternatively, the device may be made of aluminium, plastic or any other suitably strong material.

It will be understood by someone skilled in the art that many of the details provided above are by way of example only and are not intended to limit the scope of the invention which is to be determined with reference to the following claims.

What is claimed is:

1. A device for hanging an object on a wall, the device comprising:

a t-shaped wall mount for fastening to the wall, the wall mount including a first bracket portion and a second bracket portion, each of said bracket portions being u-shaped, the wall mount having a space between the first bracket portion and the second bracket portion, the wall mount including a mounting plate, the mounting plate having an elongate central portion disposed between and extending below the bracket portions, the central portion of the mounting plate having a plurality of apertures extending therethrough, the apertures enabling fasteners to pass therethrough for adjustably connecting the wall mount to the wall; and an object mount for fastening to the object, the first bracket portion and the second bracket portion being configured to receive at least part of the object mount, the object mount having a projection disposable in the space between the bracket portions, the bracket portions enabling horizontal positioning of the object mount relative to the wall mount to be adjustable, and the projection being configured to interact with the bracket portions and limit horizontal movement of the object mount relative to the wall mount to within a set range spanning the space from a first position, where the projection abuts the first bracket portion, to a second position where the projection abuts the second bracket portion.

2. The device as claimed in claim 1 wherein the object mount has an elongate rail strip configured to slidably engage with the bracket portions and wherein the projection is connected to and extends outwards from the rail strip.

3. The device as claimed in claim 2 wherein the projection is partially cut out from the rail strip and bent relative to the rail strip.

4. The device as claimed in claim 1, the object having a horizontal edge and wherein the object mount has a peripheral edge and a pair of spaced-apart positioning tabs disposed along and extending outwards from the peripheral edge of the object mount, the positioning tabs being configured to abut against the horizontal edge of the object, the positioning tabs thus acting to facilitate horizontal levelling of the object relative to the object mount and facilitate fastening the object mount to the object.

5. The device as claimed in claim 4, the object having a top, the horizontal edge of the object being disposed along the top of the object, wherein the wall mount has a top and wherein the object mount and the wall mount are configured such that when the object mount and the wall mount are engaged together, the top of the wall mount is positioned adjacent to the peripheral edge of the object mount, vertical positioning of the peripheral edge of the object mount, and therefore vertical positioning of the horizontal edge of the object, thus directly correlating with vertical positioning of the top of the wall mount relative to the wall.

6. The device as claimed in claim 4 wherein the object mount has a plurality of apertures extending parallel to and spaced-apart from the peripheral edge of the object mount, the apertures being configured to enable fasteners to pass therethrough and into the object for fastening the object mount to the object.

7. The device as claimed in claim 1, the wall having a wall stud and wherein the plurality of apertures of the central portion of the mounting plate are configured to align with the wall stud and enable said fasteners to pass therethrough for engaging with the wall stud for securely connecting the wall mount to the wall.

8. The device as claimed in claim 7, wherein the mounting plate includes a pair of peripheral portions on either side of the central portion, each peripheral portion having an aperture for enabling a further fastener to pass therethrough and fasten to the wall for further securing the wall mount to the wall.

9. The device as claimed in claim 2 wherein the object mount has an elongate mounting strip for abutting with and extending along the object, and the object mounts has an angled strip interposed between and connecting together the rail strip and the mounting strip.

10. The device as claimed in claim 2 wherein the bracket portions have u-shaped parts and further include angled strips connected to and extending outwards from the u-shaped parts of the bracket portions, respectively, the angled strips extending from the u-shaped parts of the bracket portions at a non-perpendicular angle relative to the u-shaped parts of the bracket portions, the angled strips being configured for guiding the rail strip of said the object mount to the u-shaped parts of the bracket portions.

11. The device as claimed in claim 10 wherein the object mount further includes an angled strip connected to and extending outwards from the rail strip, the angled strip of the object mounts extending from the rail strip at a non-perpendicular angle relative to the rail strip, and the angled strip of the object mount being configured to align with, at least partially extend along and abut with the angled strips of the bracket portions.

12. A device for hanging an object on a wall, the object having a horizontal edge, the wall having a wall stud, and the device comprising:
   a t-shaped wall mount for fastening to the wall stud, the wall mount including a mounting plate, the mounting plate having an elongate central portion including a plurality of apertures configured to align with the wall stud and enable fasteners to pass therethrough for engaging with the wall stud; and
   an object mount for fastening to the object, a the wall mount having at least one bracket portion configured to receive at least part of the object mount, at least part of the bracket portion being u-shaped in cross-section, the central portion of the mounting plate extending below the at least one bracket portion, the object mount having a peripheral edge, a plurality of apertures extending parallel to and spaced-apart from the peripheral edge of the object mount, and a pair of spaced-apart positioning tabs disposed along and extending outwards from the peripheral edge of the object mount, the positioning tabs being configured to abut against the horizontal edge of the object, the positioning tabs thus acting to facilitate horizontal levelling of the object relative to the object mount and facilitate insertion of fasteners through the apertures of the object mount and into the object, the object mount being fastened to the object thereby.

13. A device for hanging an object on a wall, the device comprising:
   a wall mount for fastening to the wall, the wall mount having a first bracket portion and a second bracket portion, each of said bracket portions being u-shaped, the wall mount having a space between the first bracket portion and the second bracket portion; and
   an object mount for fastening to the object, the bracket portions being configured to receive at least part of the object mount, the bracket portions enabling horizontal positioning of the object mount relative to the wall mount to be adjustable, the object mount having a projection disposable in the space between the bracket portions, the projection being configured to interact with the bracket portions and limit horizontal movement of the object mount relative to the wall mount to within a set range spanning the space from a first position, where the projection abuts the first bracket portion, to a second position where the projection abuts the second bracket portion, the object mount having an elongate rail strip configured to slidably engage with the bracket portions, the projection connecting to and extending outwards from the rail strip, the object mount having an elongate mounting strip for abutting with and extending along the object, and the object mount having an angled strip interposed between and connecting together the rail strip and the mounting strip, the angled strip extending from the rail strip at an angle equal to or greater than 90 degrees relative to the rail strip and the angled strip extending from the mounting strip at an angle equal to or greater than 90 degrees relative to the mounting strip.

14. A device for hanging an object on a wall, the object having a horizontal edge, the device comprising:
   a wall mount for fastening to the wall, the wall mount having a first bracket portion and a second bracket portion, each of said bracket portions being u-shaped, the wall mount having a space between the first bracket portion and the second bracket portion; and
   an object mount for fastening to the object, the bracket portions being configured to receive at least part of the object mount, the bracket portions enabling horizontal positioning of the object mount relative to the wall mount to be adjustable, the object mount having a projection disposable in the space between the bracket portions, the projection being configured to interact with the bracket portions and limit horizontal movement of the object mount relative to the wall mount to within a set range spanning the space from a first position, where the projection abuts the first bracket portion, to a second position where the projection abuts the second bracket portion, the object mount having an elongate rail strip configured to slidably engage with the bracket portions, the projection connecting to and extending outwards from the rail strip, the projection being a bent portion partially cut-out from the rail strip, the projection being angled at 90 degrees relative to the rail strip, the object mount having an elongate mounting strip for abutting with and extending along the object, the mounting strip including a peripheral edge, the object mount having a pair of spaced-apart positioning tabs disposed along and extending outwards from the peripheral edge of the mounting strip, the positioning tabs being angled at 90 degrees relative to the mounting strip and being configured to abut against the horizontal edge of the object, the positioning tabs thus acting to facilitate horizontal levelling of the object relative to the object mount and facilitate fastening the object mount to the object, and the object mount having an angled strip interposed between and connecting together the rail strip and the mounting strip.

* * * * *